United States Patent [19]

Rubinfield

[11] 4,319,335

[45] Mar. 9, 1982

[54] ARITHMETIC LOGIC UNIT CONTROLLER

[75] Inventor: Louis P. Rubinfield, Norristown, Pa.

[73] Assignee: Burroughs Corporation, Detroit, Mich.

[21] Appl. No.: 85,433

[22] Filed: Oct. 16, 1979

[51] Int. Cl.³ .............................................. G06F 7/50
[52] U.S. Cl. ................................................. 364/787
[58] Field of Search ............................. 364/787, 786

[56] References Cited

U.S. PATENT DOCUMENTS

| | | | |
|---|---|---|---|
| 3,697,735 | 10/1972 | Hanson | 364/787 |
| 3,947,671 | 3/1976 | Geng et al. | 364/786 |
| 3,970,833 | 7/1976 | Gehweiler et al. | 364/786 |
| 3,993,891 | 11/1976 | Beck et al. | 364/787 |

Primary Examiner—Gareth D. Shaw
Assistant Examiner—Thomas M. Heckler
Attorney, Agent, or Firm—David G. Rasmussen; Kevin R. Peterson; Edmund M. Chung

[57] ABSTRACT

A high speed parallel digital adder includes a control circuit which is the subject of this invention. The control circuit is a single integrated circuit having: add-/subtract select logic for selecting the addition and subtraction functions of the adder; a one's complement carry look ahead logic unit for generating carry look ahead signals; and a logic unit for generating the sign of the resultant of the two operands, a complement data output, the underflow, and the overflow.

7 Claims, 6 Drawing Figures

ONES COMPLEMENT LOOK AHEAD

| INPUT | OUTPUT |
|---|---|
| P0 P1 P2 G0 G1 G2 SA SB K A10 | S0 S1 S2 S3 C0 C1 C2 SF OV UF UFNCP |
| L H L H L H H H H H | L H L L L H L H L H |
| L H L H L L H H H H | L H H L L L H L H L H |
| L H L L H H H H H H | L H H L H L H H H L H |
| L H L L H L H H H H | L H H L L L H L H L H |
| L H L L L H H H H H | L H H L L L H L H L H |
| L H L L L L H H H H | L H H L L L H L H L H |
| L L H H H H H H H H | L H H L H H H H H L H |
| L L H H H L H H H H | L H H L L L H L H L H |
| L L H H L H H H H H | L H H L H H L H H H L H |
| L L H H L L H H H H | L H H L L L H L H L H |
| L L H L H H H H H H | L H H L H L L H H H L H |
| L L H L H L H H H H | L H H L L L H L H L H |
| L L H L L H H H H H | L H H L H L L H H H L H |
| L L H L L L H H H H | L H H L L L H L H L H |
| L L L H H H H H H H | L H H L H H H H H L H |
| L L L H H L H H H H | L H H L L L H L H L H |
| L L L H L H H H H H | L H H L L L H L H L H |
| L L L H L L H H H H | L H H L L L H L H L H |
| L L L L H H H H H H | L H H L L L H L H L H |
| L L L L H L H H H H | L H H L L L H L H L H |
| L L L L L H H H H H | L H H L L L H L H L H |
| L L L L L L H H H H | L H H L L L H L H L H |
| | |
| H H H H H L H H L H | H L L H L H H H H L H |
| H H H H H L H L H H | H L L H L H H H H L H |
| H H H H H L H L L H | L H H L L H H H L H L H |
| H H H H H L L H H H | H L L H L H H L H H L H |
| H H H H H L L H L H | L H H L L H H L H L H H |
| H H H H H L L L H H | L H H L L H H L H L H H |
| H H H H H L L L L H | H L L H L H H L H H L H |
| | |
| L H H H H H H H H L | L H H L H H H L H L H |
| L H H H H H H H L H | H L L H H H H L H H L L |
| L H H H H H H L L H | H L L H H H H L H H L H |
| L H H H H H L H H H | L H H L L H H L H L H |
| L H H H H L H H H L | L H H L L H L H L H |
| L H H H H L H H L H | H L L H L L H H H H L H |
| L H H H H L H H L L | H L L H L L H H L H L H |

| INPUT | | | | | | | | | | OUTPUT | | | | | | | | | | | |
|---|---|---|---|---|---|---|---|---|---|---|---|---|---|---|---|---|---|---|---|---|---|
| P0 | P1 | P2 | G0 | G1 | G2 | SA | SB | K | A10 | S0 | S1 | S2 | S3 | C0 | C1 | C2 | SF | OV | UF | UFN | CP |
| H | H | H | H | H | H | H | H | H | H | L | H | H | L | H | H | H | H | H | H | L | H |
| H | H | H | H | H | H | H | H | L | H | H | L | L | H | H | H | H | L | H | H | L | L |
| H | H | H | H | H | H | H | L | H | H | H | L | L | H | H | H | H | L | H | H | L | L |
| H | H | H | H | H | H | H | L | L | H | L | H | H | L | H | H | H | H | H | H | L | H |
| H | H | H | H | H | H | L | H | H | H | H | L | L | H | H | H | H | H | H | H | L | L |
| H | H | H | H | H | H | L | H | L | H | L | H | H | L | H | H | H | L | H | H | L | H |
| H | H | H | H | H | H | L | L | H | H | L | H | H | L | H | H | H | L | H | H | L | H |
| H | H | H | H | H | H | L | L | L | H | H | L | L | H | H | H | H | H | H | H | L | L |
| H | H | H | H | L | H | H | H | H | H | L | H | H | L | L | H | H | H | L | H | L | H |
| H | H | H | L | H | H | H | H | H | H | L | H | H | L | H | H | L | H | H | H | L | H |
| H | H | H | L | L | H | H | H | H | H | L | H | H | L | L | H | L | H | L | H | L | H |
| H | H | L | H | H | H | H | H | H | H | L | H | H | L | H | L | H | H | H | H | L | H |
| H | H | H | L | H | L | H | H | H | H | L | H | H | L | L | H | H | L | H | L | H | H |
| H | H | H | L | L | H | H | H | H | H | L | H | H | L | H | L | L | H | H | H | L | H |
| H | H | H | L | L | L | H | H | H | H | L | H | H | L | L | L | H | L | H | L | H | L |
| H | H | L | H | H | H | H | H | H | H | L | H | H | L | H | H | H | H | H | H | L | H |
| H | H | L | H | H | L | H | H | H | H | L | H | H | L | L | H | H | H | L | H | L | H |
| H | H | L | H | L | H | H | H | H | H | L | H | H | H | L | H | L | H | L | H | L | H |
| H | H | L | H | L | L | H | H | H | H | L | H | H | L | L | H | L | H | L | H | L | H |
| H | H | L | L | H | H | H | H | H | H | L | H | H | L | H | L | H | H | H | H | L | H |
| H | H | L | L | H | L | H | H | H | H | L | H | H | L | L | L | H | H | L | H | L | H |
| H | H | L | L | L | H | H | H | H | H | L | H | H | L | L | L | L | H | L | H | L | H |
| H | H | L | L | L | L | H | H | H | H | L | H | H | L | L | L | L | H | L | H | L | H |
| H | L | H | H | H | H | H | H | H | H | L | H | H | L | H | H | H | H | H | H | L | H |
| H | L | H | H | L | H | H | H | H | H | L | H | H | L | L | H | H | L | H | L | H | H |
| H | L | H | H | L | H | H | H | H | H | L | H | H | L | H | H | L | H | H | H | L | H |
| H | L | H | H | L | L | H | H | H | H | L | H | H | L | L | H | L | H | L | H | L | H |
| H | L | H | L | H | H | H | H | H | H | L | H | H | L | L | L | L | H | H | H | L | H |
| H | L | H | L | H | L | H | H | H | H | L | H | H | L | L | L | L | H | L | H | L | H |
| H | L | H | L | L | H | H | H | H | H | L | H | H | L | H | L | L | H | H | H | L | H |
| H | L | H | L | L | L | H | H | H | H | L | H | H | L | L | L | L | H | L | H | L | H |
| H | L | L | H | H | H | H | H | H | H | L | H | H | L | H | H | H | H | H | H | L | H |
| H | L | L | H | H | L | H | H | H | H | L | H | H | L | L | H | H | L | H | H | L | H |
| H | L | L | H | L | H | H | H | H | H | L | H | H | L | L | H | L | H | L | H | L | H |
| H | L | L | H | L | L | H | H | H | H | L | H | H | L | L | H | L | H | L | H | L | H |
| H | L | L | L | H | H | H | H | H | H | L | H | H | L | L | L | H | L | H | L | H | L |
| H | L | L | L | H | L | H | H | H | H | L | H | H | L | L | L | L | H | L | H | L | H |
| H | L | L | L | L | L | H | H | H | H | L | H | H | L | L | L | L | H | L | H | L | H | ns
ARITHMETIC LOGIC UNIT CONTROLLER

BACKGROUND OF THE INVENTION

1. Field of the Invention

The invention relates to a multifunctional integrated circuit for controlling the addition and subtraction functions of a high speed parallel digital adder.

2. Description of the Prior Art

A typical high speed parallel digital adder may include logic which will perfrom several functions which are necessary for operation or will improve the adders performance. First, the adder may include look ahead logic which generates carry or borrow information in parallel for all orders of bits added or subtracted. Secondly, the adder will have select logic which will provide control signals to the arithmetic logic units of its adder to select the add or subtract function. The adder may also contain error logic to ensure the results of the arithmetic logic unit computation. These operations and their associated logic equations are all known in the art. However, up to the present time each of these functions have been performed using one or more integrated circuits. These circuits all have some common logic and inputs. This commonality has not been used to simplify the circuits. This has resulted in more complex, expensive logic with less than optimal processing time in the arithmetic logic units.

SUMMARY OF THE INVENTION

The present invention provides a single integrated control circuit using common logic and inputs to control the above desired functions of a high speed digital adder. The adder includes: the control circuit, multiple arithmetic logic units, error logic, and a resultant complementer unit. The control circuit has add/subtract select logic which receives the signs of the two operands being added by the adder and an add/subtract control signal. The select logic generates add/subtract select signals which are provided to the arithmetic logic units to select the add or subtract function. The control circuit also has one's complement carry look ahead logic which receives carry propagate and generate output signals from the multiple arithmetic logic units, and generates carry look ahead signals which are fed back to the arithmetic logic units. A third logic unit receives the carry propagate & generate output signals, at least one of the carry look ahead signals, the most significant bit and sign of one of the operands, and the add/subtract select signals. The logic unit generates a complement data output which is fed to the resultant complementer unit to complement the resultant of the arithmetic logic units; a sign of the resultant which is fed to the resultant complementer unit; and underflow and an overflow which are fed to the error logic.

BRIEF DESCRIPTION OF THE DRAWINGS

FIG. 2, 2a is a schematic diagram of the logic implementing the control circuit of FIG. 1.

FIG. 3 is a partial truth table of the logic circuitry shown in FIG. 2.

FIG. 4, 4a is a continuation of the truth table of FIG. 3.

DESCRIPTION OF THE PREFERRED EMBODIMENT

Figure 1:
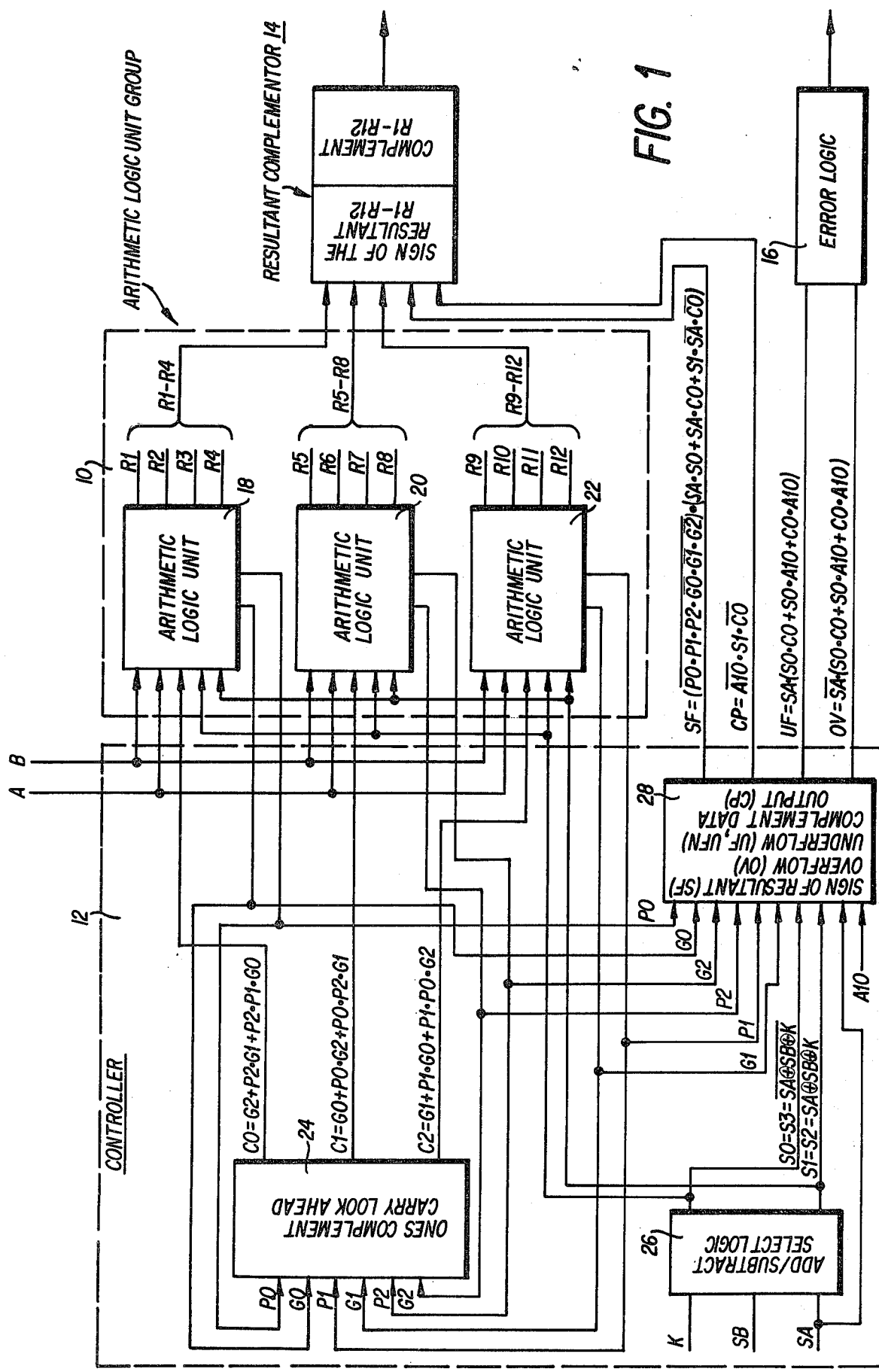
FIG. 1 is a block diagram of a control circuit for a high speed parallel digital adder.

A high speed parallel digital adder is shown in FIG. 1. Included are an arithmetic logic unit group (ALU) 10, a controller 12, a resultant complementer unit 14, and error logic 16.

ALU group 10 is made up of three arithmetic logic units ALU's 18, 20, 22. The ALU's are conventional units such as TI 74181 manufactured by Texas Instruments. They are multifunctional and require specific control signals to select the add and subtract function desired. These control signals are provided by controller 12. Each ALU will add or subtract four bits of input operands A and B. This enables a 12 bit word to be processed. Each ALU provides carry output signals to the controller 12. The carry output signals are carry propogate signals P0, P1, P2 and carry generate signals G0, G1, G2. ALU units 18, 20, 22 generate resultant output bits R1-R4, R5-R8 and R9-R12, respectively.

Controller 12 is made up of a one's complement look ahead circuit 24, an add/subtract select logic circuit 26, and a logic circuit 28 which computes the sign of the resultant (SF), the underflow (UF, UFN), the overflow (OV), and a signal to complement the resultant output (CP).

Add/subtract select logic unit 26 generates signals which select the add or subtract function of ALU units 18, 20, 22. The inputs to the add/subtract select logic are an add/subtract control signal K, the sign of the A operand SA, and the sign of the B operand SB. Add subtract control signal K is high if the desired function is addition and low if it is subtraction. The inputs are processed in add/subtract logic unit 26 according to the following logic equations:

$$S0 = S3 = \overline{SA \oplus SB \oplus K} \tag{4}$$

$$S1 = S2 = SA \oplus SB \oplus K \tag{5}$$

Add/subtract control signal K tells the add/subtract select logic unit 26 whether the add or subtract operation is desired. The add/subtract select logic unit 26 then takes the signs of the operands SA and SB into consideration in generating the logic signal fed to the ALU units to allow them to perfrom the add or subtract function. An addition or subtraction operation will differ depending on the sign of the operand.

The outputs S0, S1, S2, S3, are the outputs provided to ALU units 18, 20, 22 to select either the add or subtract function.

The one's complement look ahead 24 receives as inputs the carry propagate signals P0, P1, P2 and carry generate signals G0, G1, G2 from ALU units 18, 20, 22. These signals are processed to generate carry look ahead signals C0, C1, C2 according to the following logic equations.

$$C0 = G2 + P2 \cdot G1 + P2 \cdot P1 \cdot G0 \tag{1}$$

$$C1 = G0 + P0 \cdot G2 + P0 \cdot P2 \cdot G1 \tag{2}$$

$$C2 = G1 + P1 \cdot G0 + P1 \cdot P0 \cdot G2 \tag{3}$$

Outputs C0, C1, C2 are fed to ALU units 18, 20, 22 respectively. The carry look ahead logic generates the required carry or borrow information in parallel for all orders of bits for the addition and subtraction functions of the ALU's.

The third unit of controller 12 is the logic circuit 28 which serves several functions. It computes the sign of the resultant R1-R12 (SF). Secondly, it determines whether the overflow, (OV) or underflow (UF, UFN) have occurred. Thirdly, it computes the complement data output (CP) which is used to bit-by-bit complement the resultant R1-R12. The inputs to logic circuit 28 are the carry output signals P0, P1, P2, G0, G1, G2, the add/subtract bit of the A operand A/U. The sign of the resultant (SF) is computed according to the following logic equation:

$$SF = \overline{(P0 \cdot P1 \cdot P2 \cdot G0 \cdot G1 \cdot G2)} \cdot (SA \cdot S0 + SA \cdot C0 + S1 \cdot SA \cdot C0)$$

SF is the applied to resultant complementor unit 14.

The complement data output (CP) is computed according to the logic equation:

$$CP = A10 \cdot S1 \cdot C0 \qquad (7)$$

CP is also applied to the resultant complementer unit 14.

The overflow (OV) and underflow (UF, UFN) are computed according to the logic equations:

$$OV = SA \cdot (S0 \cdot C0 + S0 \cdot A10 + C0 \cdot A10) \qquad (8)$$

$$UF = SA \cdot (S0 \cdot C0 + S0 \cdot A10 + C0 \cdot A10) \qquad (9)$$

OV and UF are then fed to error logic unit 16 where the system may interpret these signals appropriately.

The resultant complementer unit 14 adds the sign of the resultant SF to the data field for resultant R1-R12. This is done by conventional apparatus. The resultant complementer unit 14 has the ability to perform a bit-by-bit complement of the data.

All of the logic equations for the one's complement look ahead 24, the add subtract logic 26, and the logic circuit 28 are known in the art. Each of these equations presently would be handled by a separate logic circuit using one of more integrated circuits. What the present invention has done is recognize the commonality of logic in these equations and interdependence of inputs and outputs and incorporated all of the logic equations into one integrated circuit. The invention resides in the arrangement of logic necessary to implement the logic equations in one integrated circuit.

Figure 2:
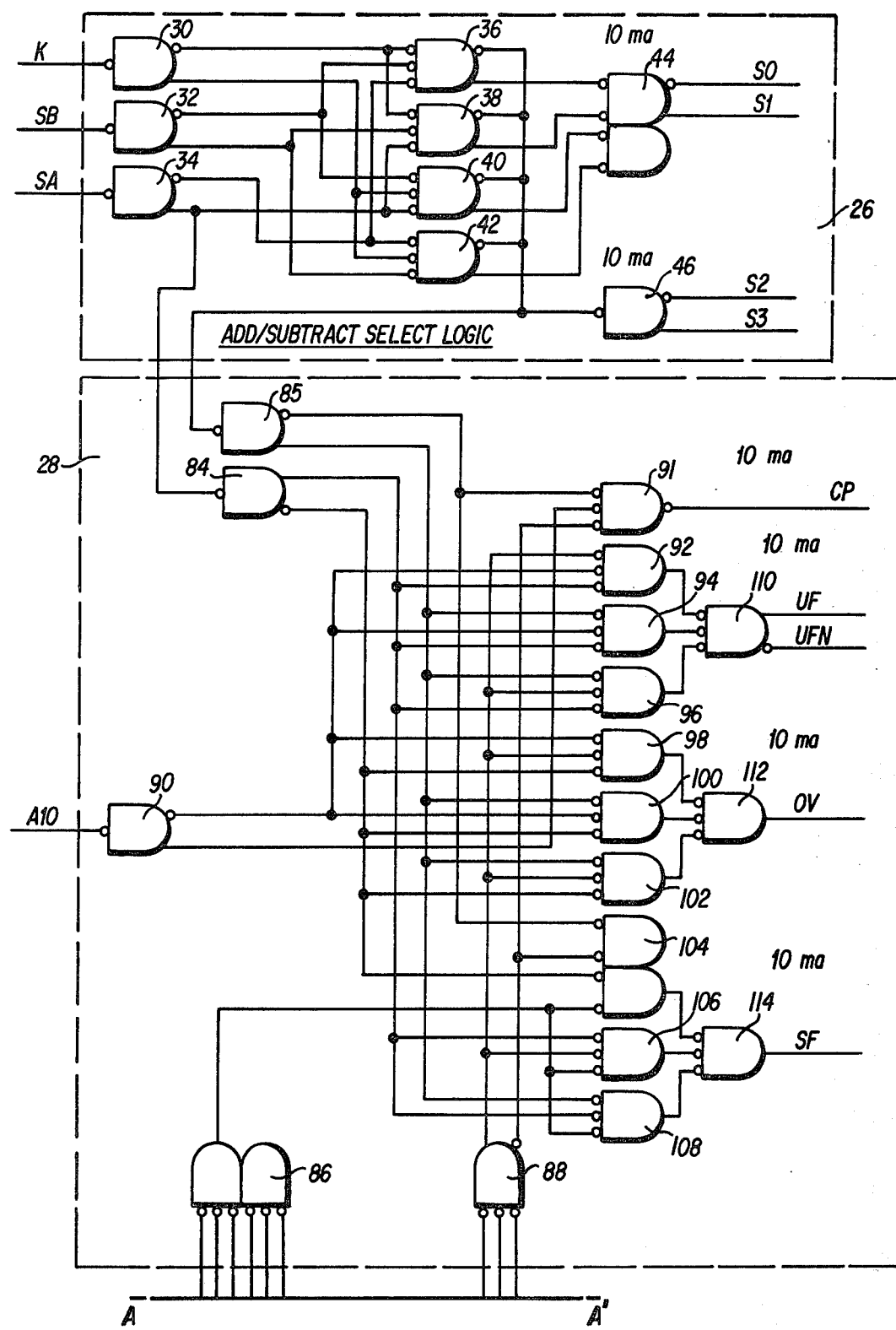

FIG. 2 shows the logic of the controller. The circuit for add/subtract select logic 26 includes AND/NAND gates 30, 32, 34 which receive respectively inputs K, SB, and SA. The output of these gates are fed to a second level of AND/NAND gates 36, 38, 40, 42. These in turn are fed to AND/NAND gate 44, AND/NAND gate 46. Gates 30-46 implement logic equations (4) (5) and generate add/subtract select signals S0, S1, S2, S3.

The circuitry for ones complements look ahead logic 24 includes AND/NAND gates 48, 50, 52, 54, 56, 58 which receive respectively carry outputs G2, P2, G1, P1, G0, and P0. The outputs of these gates are fed to a second level of AND/NAND gates 60-76. The outputs of these gates are fed to AND/NAND gates 78, 80, 82 which provide carry look ahead signals C0, C1, C2. AND gates 48-82 implement logic equations (1), (2), (3).

The circuit for logic unit 28 makes use of the logic of and/subtract select logic 26 and one's complement look ahead logic 24. AND/NAND gate 84 receives the input SA from the add/subtract select logic 26 while AND/NAND gate 85 receives the inputs S0 and S1. Similarly, the carry output signals G2, P2, G1, P1, G0, P0 are processed in one's complement look ahead 24 and provided to logic circuit 28 through gate 86 and AND/NAND gate 88. The inputs from add/subtract select logic 26 and look ahead logic 24 combine with the input A/10 from AND/NAND gate 90 to provide inputs to AND/NAND gates 91-108. The output of gate 90 provides the complement data output CP. The outputs of AND/NAND gate 92-108 are fed to AND/NAND gates 110, 112, and 114 which provide, respectively, the underflow (UF, UFN), the overflow (OV) and the sign of the result (SF).

Figures 2A, 4A:
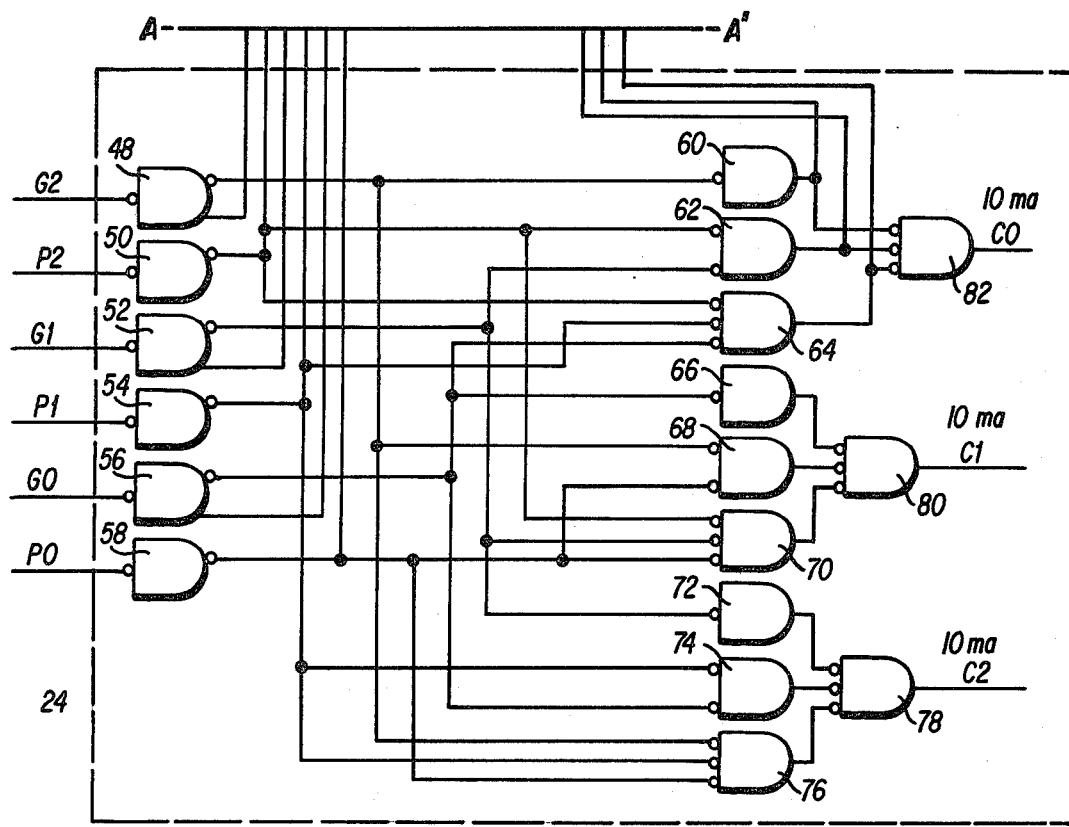

FIG. 3 and FIG. 4 show conventional partial truth tables for the logic circuit shown in FIG. 2.

In operation the add subtract select logic unit 26 receives the signs SA and SB of operands A and B along with an add/subtract control signal K and computes select signals S0, S1, S2, S3 which are fed to the ALU units to designate whether the add or subtract function is desired.

Two 12-bit operands A and B are then fed to ALU units 18, 20, 22. ALU 18 operates on the first 4 bits; ALU 20 operates on the second 4 bits; and ALU 22 operates on the last 4 bits. The ALU units generate the carry output signals P0, G0, P1, G1, Ps, G2, and forward these to the ones complement look ahead 24. This unit generates carry look ahead signals C0, C1, C2 and forwards these signals back to ALU units 18, 20, 22 respectively. The look ahead signals provide the required carry or borrow information in parallel for all orders of bits. This enables the ALU units to achieve faster operation. Additionally, the carry look ahead signal C0 along with the processed carry output signals P0, P1, P2, G0, G1, G2 are fed to the logic unit 28. The ALU units perform either the addition and subtraction on the respective 4 bits words and provide the resultant R1-R4, R5-R8, R9-R12. The words are combined into a 12 bit word in resultant complementer unit 14.

The sign of the resultant and instructions to complement the resultant are received from the logic unit 28. To accomplish this, logic unit 28 receives the carry look ahead signal C0 and the processed carry output signal P0, P1, P2, G0, G1, G2 from the ones complement look ahead circuit 24. It also receives the most significant bit of the A operand A10 and the select signals S0, S1 from add subtract select logic 26. These signals are all processed in logic unit 28 to generate the sign of the resultant and instructions to complement the output. The sign is placed in the data field for the 12 bit resultant and the resultant is thus complemented if instructed to do so.

Additionally, the logic unit provides the underflow and overflow to error logic unit 16.

What is claimed is:

1. A control circuit for controlling a high speed parallel digital adder which adds two digital operands, the digital adder having available as inputs: carry propogate and generate output signals, the most significant bit of one of the operands, the signs of the operands, and an add/subtract control signal, comprising: a single integrated circuit having;
    add/subtract select logic receiving the signs of the two operands and the add/subtract control signal for generating add/subtract select signals to control selection of the addition or subtraction function of the digital adder, one's complement carry look ahead logic receiving said carry propagate and generate output signals for generating multiple carry look ahead signals for use in said digital adder; and logic means receiving said carry propogate and generate output signals, at least one of said carry look ahead signals, the most significant bit and sign of one of said operands and said add/subtract select signals for computing a sign of the resultant of the two digital operands, a complement data output for complementing the resultant, an underflow and an overflow, all for use in said digital adder.

2. A control circuit for controlling a high speed parallel digital adder which adds two digital operands, the adder includes the control circuit, multiple arithmetic logic units, error logic, and a resultant complementer unit, the adder further has available as inputs to the control circuit carry propagate and generate output signals, the most significant bit of one of the operands, the signs the two operands and an add/subtract control signal, the control circuit comprising:

add/subtract select logic receiving the signs of the two operands and the add/subtract control signal for providing select signals to said arithmetic logic units for use in selecting the addition and subtraction functions;

one's complement carry look ahead logic receiving said propogate and generate carry output signals for providing multiple carry look ahead signals to said arithmetic logic units; and logic means receiving said carry propogate and generate output signals, at least one of said carry look ahead signals, the most significant bit and sign of one of said operands and said select signals for computing a sign of the resultant, a complement data output, an overflow and an underflow, the sign of the resultant being provided to said resultant complementer unit to provide a sign for the resultant of said arithmetic logic units, the complement data output being provided to said resultant complementer unit to complement the resultant, said overflow and underflow being provided to said error logic.

3. The apparatus of claim 2 in which said multiple arithmetic logic units are three in number.

4. The apparatus of claim 3 in which said control circuit is a current mode logic monolithic medium scale integrated circuit.

5. The apparatus of claim 4 in which said carry propagate and carry generate signals are generated by said multiple arithmetic logic units and provided to said one's complement look ahead circuit.

6. A circuit for controlling a high speed parallel digital adder which adds two digital operands A and B, the adder including the control circuit, three arithmetic logic units, error logic, and a resultant complementer unit, the adder having available as inputs to the control circuit: carry propagate signals P0, P1, P2, the most significant bit of the A operand A10, the signs of the two operands SA and SB, and an add/subtract control signal K, the control circuit comprising:

add/subtract select logic receiving SA, SB, K and generating add/subtract select outputs S0, S1, S2, S3 which are provided to said arithmetic logic units, the add/subtract select outputs being defined by the equations $$S0 = S3 = \overline{SA \oplus SB \oplus K}$$

$$S1 = S2 = SA \oplus SB \oplus K;$$

one's complement carry look ahead logic receiving P0, P1, P2, F0, G1, F2 and providing carry look ahead signals C0, C1, C2 to said arithmetic units, said carry look ahead signals defined by the equations $$C0 = G2 + P2 \cdot G1 + P2 \cdot P1 \cdot G0$$

$$C1 = G0 + P0 \cdot G2 + P0 \cdot P2 \cdot G1$$

$$C2 = G1 + P1 \cdot G0 + P1 \cdot P0 \cdot G2;$$

Logic means receiving P0, P1, P2, G0, F1, F2, C0, A10, SA, S0, S1 for computing a sign of the resultant (SF) a complement data output (CP), an overflow (OV) and an underflow (UF), said sign of the resultant SF and complement data output CP being applied to said resultant complementer, unit, said overflow (OV) and underflow (UF) being applied to said error logic, the outputs SF, SP, OV, and UF being defined by the equation $$SF = (P0 \cdot P1 \cdot P2 \cdot G0 \cdot G1 \cdot G2) \cdot (SA \cdot S0 + SA \cdot C0 + S1 \cdot \overline{SA \cdot C0})$$

$$CP = \overline{A10} \cdot S1 \cdot \overline{C0}$$

$$OV = \overline{SA} \cdot (S0 \cdot C0 + S0 \cdot A10 + C0 \cdot A10)$$

$$UF = SA \cdot (S0 \cdot C0 + S0 \cdot A10 + C0 \cdot A10)$$

7. A high speed parallel digital adder for adding two digital operands, the adder having available as inputs: carry generate and propogate output signals, the most significant bit of one of the operands, the sign of the operands and an add/subtract control signal comprising:

multiple arithmetic logic units;

a resultant complementer unit;

a control circuit having add/subtract select logic which receives the sign of the operands and the add/subtract select signals to said arithmetic logic units for use in selecting the addition and subtraction functions;

one's complement carry look ahead logic receiving said carry output signals and providing multiple carry look ahead signals to said arithmetic logic units; and logic means receiving said carry output signals, at least one of said carry look ahead signals, the most significant bit and sign of one of said operands and said select signals for computing a sign of the resultant, a complement data output, an overflow and an underflow, the sign of the resultant being provided to said resultant complementer unit to provide a sign for the resultant of said arithmetic logic units, the complement data output being provided to said resultant complemeter unit to complement the resultant, said overflow and underflow being provided to said error logic.

* * * * *